United States Patent
Karlsen et al.

(10) Patent No.: US 7,282,638 B2
(45) Date of Patent: Oct. 16, 2007

(54) PROTECTION PROFILE FOR SUBSEA CABLES

(75) Inventors: Jan Erik Karlsen, Kolbon (NO); Lars Hennig, Berg (NO); Havard Ilstad, Trondheim (NO); Bjorn Melve, Trondheim (NO)

(73) Assignee: Nexans Statoil ASA (NO)

( * ) Notice: Subject to any disclaimer, the term of this patent is extended or adjusted under 35 U.S.C. 154(b) by 0 days.

(21) Appl. No.: 11/336,604

(22) Filed: Jan. 19, 2006

(65) Prior Publication Data

US 2006/0243471 A1    Nov. 2, 2006

(30) Foreign Application Priority Data

Jan. 31, 2005   (NO) .................................. 20050552

(51) Int. Cl.
*H01B 9/06*     (2006.01)

(52) U.S. Cl. ..................................................... 174/15.1

(58) Field of Classification Search .................. 174/36, 174/110 R, 111, 112, 113 R, 113 AS, 113 C, 174/115, 116
See application file for complete search history.

(56) References Cited

U.S. PATENT DOCUMENTS

| | | | | |
|---|---|---|---|---|
| 1,864,960 A * | 6/1932 | Taylor | ........................... | 166/60 |
| 4,196,307 A * | 4/1980 | Moore et al. | ................... | 174/47 |
| 4,262,703 A * | 4/1981 | Moore et al. | ................ | 138/115 |
| 4,961,307 A * | 10/1990 | Cook | ........................... | 57/310 |
| 5,145,007 A * | 9/1992 | Dinkins | ....................... | 166/386 |
| 5,146,982 A * | 9/1992 | Dinkins | ....................... | 166/65.1 |
| 5,269,377 A * | 12/1993 | Martin | ........................ | 166/385 |
| 5,553,666 A * | 9/1996 | Hartman | ....................... | 166/60 |
| 5,782,301 A * | 7/1998 | Neuroth et al. | .............. | 166/302 |
| 5,902,958 A * | 5/1999 | Haxton | ........................ | 174/47 |
| 5,979,506 A * | 11/1999 | Aarseth | ........................ | 138/33 |
| 6,046,404 A * | 4/2000 | Figenschou et al. | ........... | 174/47 |
| 6,213,157 B1* | 4/2001 | Thiebaud et al. | ............. | 138/149 |
| 6,239,363 B1* | 5/2001 | Wooters | ........................ | 174/47 |
| 6,417,457 B1 | 7/2002 | Aasbo et al. | ................ | 174/120 |
| 6,585,046 B2* | 7/2003 | Neuroth et al. | .............. | 166/302 |
| 6,848,510 B2* | 2/2005 | Bixenman et al. | ........... | 166/385 |
| 6,988,555 B2* | 1/2006 | Uhlenkott | ..................... | 166/369 |
| 7,044,223 B2* | 5/2006 | Dalrymple et al. | .......... | 166/302 |
| 2004/0076476 A1* | 4/2004 | Hallot et al. | ................. | 405/157 |
| 2005/0241717 A1* | 11/2005 | Hallot et al. | ................. | 138/149 |

FOREIGN PATENT DOCUMENTS

JP             07031031          1/1995

OTHER PUBLICATIONS

Norwegian Search Report- Aug. 30, 2005.

* cited by examiner

*Primary Examiner*—William H. Mayo, III
(74) *Attorney, Agent, or Firm*—Sofer & Haroun, LLP

(57) ABSTRACT

An elongated object for use in subsea having a heating pipe and an electrical cable fixed to the surface of the heating pipe. The electrical cable has a protective sleeving for surrounding the electrical cable, composed of a series of elongated synthetic plastics components arranged end-to-end. Each component is an extruded frame work type hollow profile suitable for slowing down the impact over a long deformation path. A hollow space is disposed between the electrical cable and the protective sleeving allowing the cable to move into the protective sleeving.

8 Claims, 3 Drawing Sheets

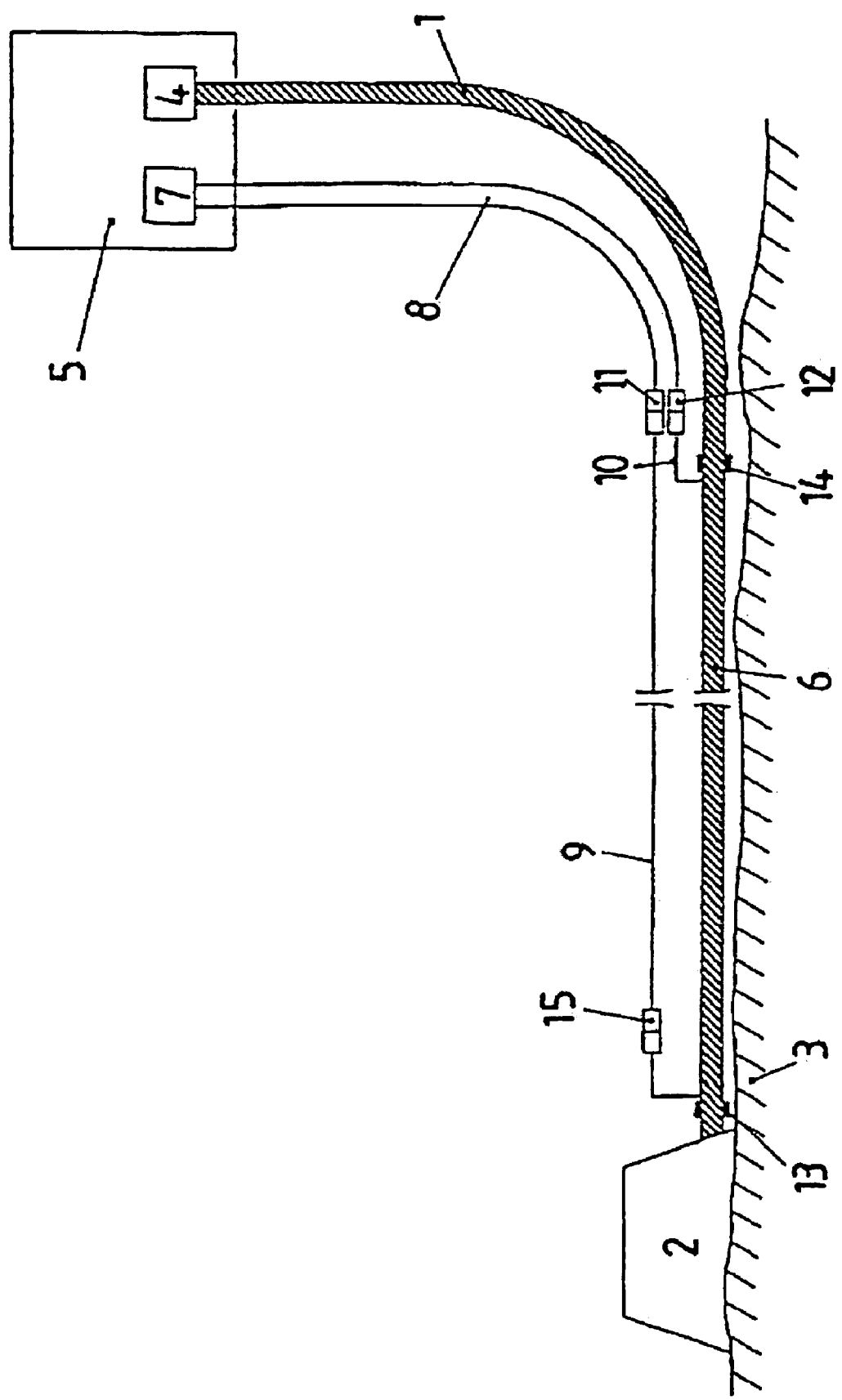

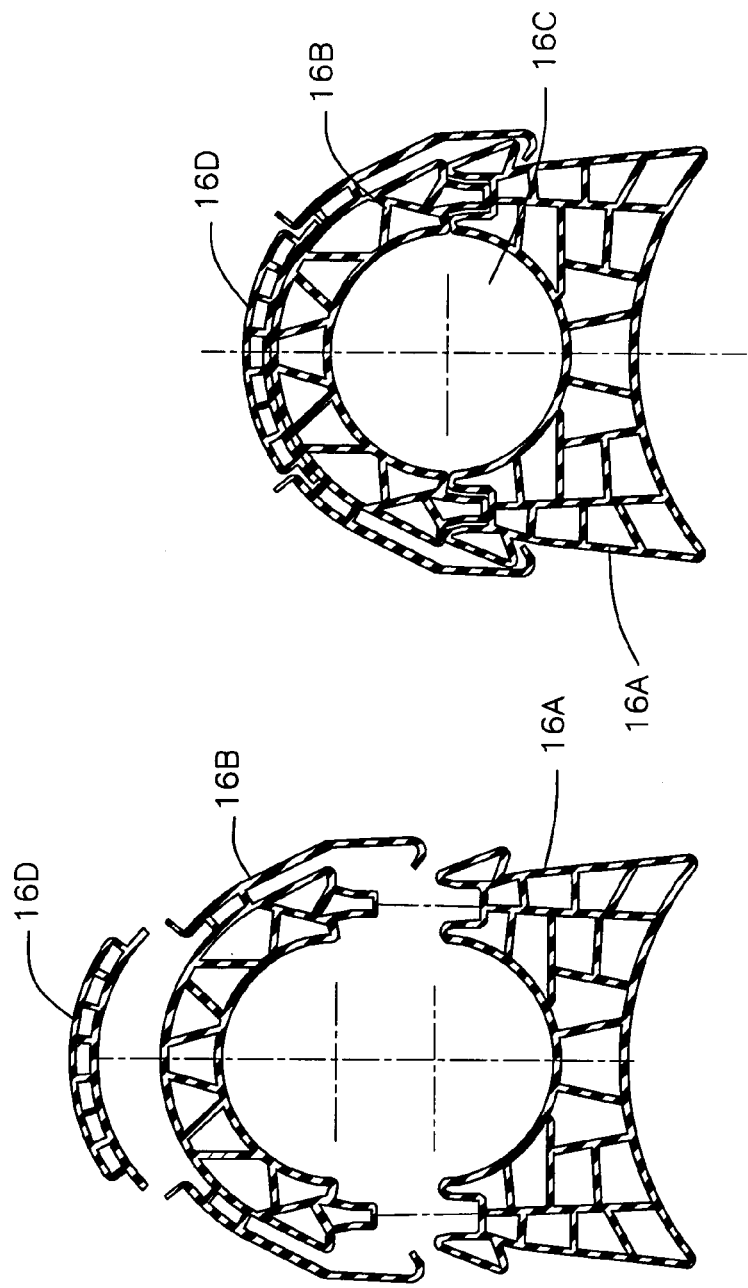

PROTECTION PROFILE FOR SUBSEA CABLES

RELATED APPLICATION

This application relates to and claims the benefit of priority from Norwegian Patent Application No. 2005 0552, filed on Jan. 31, 2005, the entirety of which is incorporated herein by reference.

FIELD OF THE INVENTION

The present invention relates to a protective sleeving for surrounding an elongated object.

BACKGROUND

For the energy support of electrical devices on the seafloor, subsea cables are known in the state of the art which contain one or several conductors with an insulation and an outer sheath. The cable is generally armoured to be protected from damage which may be caused by outer impact forces, e.g. by fishing gears or falling objects.

A solution to this problem is presented in U.S. Pat. No. 6,417,457. This patent suggests an electrical subsea cable with a conductor, an insulation and a sheath wherein the sheath comprises two polymer layers, wherein the outer layer of the sheath has a mechanical hardness that is higher than a hardness of the insulation and wherein a hardness of an inner layer of the sheath is lower than a hardness of the insulation. The sheath has a slit parallel to a lengthwise direction of the cable. The bedding ensures that damages of the insulation are avoided even if the outer layer is deformed due to outer forces.

Another solution is presented in the published UK Patent Application 2365941. This publication presents a protective sleeving for surrounding an elongated object to be protected. This sleeving is composed of a series of cylindrical elongated synthetic plastics components arranged end-to-end. The components are joined to one another by the interengagement of complementary spigot portions and bores at the ends of adjacent components and by bands fitted in external grooves to surround the interengaged spigot portions and bores. Each sleeving component is composed of individual sections separable along a radial or diametric plane relative to the axis of the component and the sections are connected to one another by means of elongated projections snugly fitted in complementary openings. The protective sleeving is to surround elongated objects such as hoses, pipes and cables for many applications particularly in marine installations, where it is desirable to provide a means of protecting such objects from impact and damage.

OBJECTS AND SUMMARY

It is an object of the present invention to provide an elongated object for use in subsea comprising a heating pipe and an electrical cable fixed to the surface of the heating pipe, wherein the electrical cable has a protective sleeving suitable for slowing down the impact over a long deformation path occurring under the sea and preventing tension in the electric cable when the heating pipe expands due to heat.

According to the invention, the elongated object for use in subsea, comprising a heating pipe, and an electrical cable fixed to the surface of the heating pipe, wherein the electrical cable has a protective sleeving for surrounding said electrical cable, said sleeving being composed of a series of elongated synthetic plastics components arranged end-to-end, each component being an extruded frame work type hollow profile suitable for slowing down the impact over a long deformation path, and a hollow space is disposed between the electrical cable and the protective sleeving allowing the cable to move into the protective sleeving.

The main features of the invention are defined in the accompanying claims.

The proposed protective sleeving is suitable for a subsea cable for use in an electrical heating system for an insulated metallic tube especially a pipeline, wherein a current is fed through the wall of the tube. The tube is preferably made of a ferromagnetic material like steel and heated by an alternating current.

BRIEF DESCRIPTION OF THE DRAWINGS

The foregoing and other objects, features and advantages of the present invention will become more apparent in the following detailed description of preferred embodiments as illustrated in the accompanying drawings.

FIG. 1 shows a heating system with an electrical cable with a protective sleeving according to the invention.

FIGS. 4 and 5 show an enlarged view of the protective sleeving.

DETAILED DESCRIPTION

Figure 3:
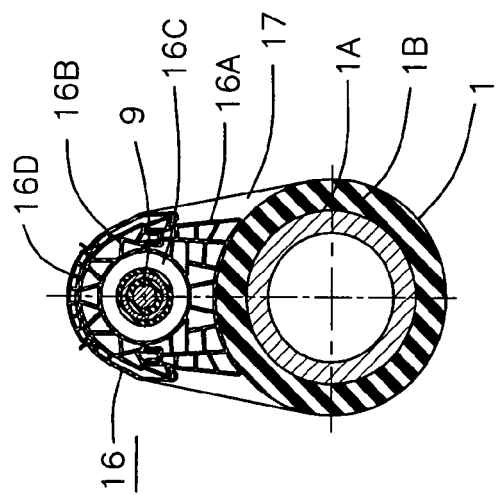
FIG. 3 shows a cross-section of the object of FIG. 2.

In FIG. 1, a pipeline heating system which comprises an electrical cable is illustrated. An insulated metallic tube 1 (i.e. the pipeline) connects a template 2 on the seafloor 3 with a processing unit 4 installed on a platform 5. The tube 1 has an outer thermal insulation ensuring that crude oil coming from the template 2 has a sufficiently low viscosity until it reaches the platform 5. If the oil flow is stopped, formation of hydrate plugs and wax deposits occur which can block the pipeline when oil transportation is to be resumed again. To avoid this problem the tube 1 can be heated. One or several sections 6 of the tube 1 are connected to a power supply unit 7 installed on the platform 5 with a riser cable 8 containing one or more conductor pairs with an insulating feeder and return conductor. The riser cable 8 is protected by an armouring and an outer sheathing. At the lower end of the riser cable 8, single conductor cables 9, 10 connect a section 6 of tube 1 to a pair of feeder and return conductors in riser cable 8. For this purpose, connecting elements 11, 12, 15 are proposed. Insulated flanges 13, 14 insulate the sections 6 of a pipeline from each other.

The power supply unit 7 generates an electrical AC current which causes a heating of the tube 1 and ensures a sufficiently low viscosity of the material inside the tube 1.

Figure 2:
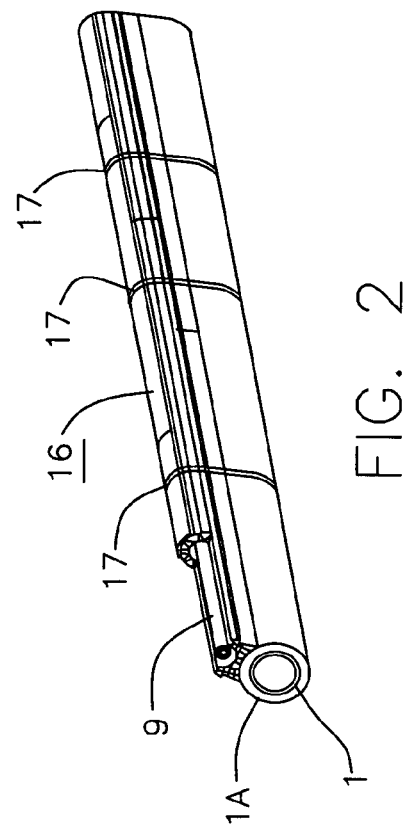
FIG. 2 shows an elongated object according to the invention.

FIG. 2 illustrates a view of section 6. The single conductor cable 9 is wrapped with a protective sleeving 16, which will be better described together with FIG. 3. The protective sleeving 16 comprises several sections arranged end to end around the single conductor cable 9. The joints between the strapped sleeving elements 16a, 16b and 16d (FIG. 3) are staggered. The single conductor cable 9 and the protective sleeving 16 are fixed to the pipe 1 with tapes 17 wrapped around the pipe 1 and the protective sleeving 16. The tapes 17 consist of stainless material preferably of stainless steel.

FIG. 3 illustrates a cross-section of the arrangement shown in FIG. 2.

The pipe 1 comprises a metal pipe 1a which is surrounded by an extruded sheath 1b of a polymeric material such as polyethylene, polypropylene or other resistant material. The protective sleeving 16 is made of two sections 16a and 16b which are joined together thereby forming a hollow space 16c in which the single conductor cable 9 is located. The diameter of the cable 9 is less than the inner diameter of the protective sleeving 16. One surface of section 16a is shaped complementary to the surface of the pipes 1.

Part of the section 16b is an element 16d, which bridges the joints of the sections 16b.

Sections 16a and 16b are extruded frame work type hollow profiles made advantageously of polypropylene. The frame work allows to slow down an impact over a long deformation path and protects the single conductor cable 9 in the case of a serious impact.

FIG. 4 illustrates the sections 16a, 16b and 16d before they have been joined together to the protective sleeving 16.

FIG. 5 illustrates the protective sleeving 16 after joining the sections 16a, 16b and 16d.

The sections 16a, 16b and 16d can be extruded in great lengths and are coiled on a cable reel. The cable reels (not shown) are transported to a vessel and the sections 16a, 16b and 16d are cut off from the continuous lengths with a length of about 3 m and laid around the single conductor cable 9 drawn-off from a cable drum.

The hollow space 16c allows the cable to lay in a S-shape or in a helix configuration. This is in order to prevent tension in the single conductor cable 9 when the pipe 1 expands caused by heat.

The single conductor cable 9 with the protective sleeving 16 can be made in continuous lengths up to and above 6000 meters.

The protective sleeving 16 withstands impacts up to and more than 7.5 kJ from fishing gear and trawl boats.

The protective sleeving allows a certain water circulation around the single conductor cable, in order to cool down the cable.

The invention claimed is:

1. Elongated object for use in subsea, comprising:
    a heating pipe, and
    an electrical cable fixed to the surface of the heating pipe, wherein the electrical cable has a protective sleeving for surrounding said electrical cable, said sleeving being composed of a series of elongated synthetic plastics components arranged end-to-end, each component being an extruded frame work type hollow profile suitable for slowing down impacts occurring over a long deformation path, and
    a hollow space is disposed between the electrical cable and the protective sleeving allowing the cable to move within the protective sleeving.

2. Elongated object according to claim 1, wherein the components is made from a synthetic plastics with good mechanical properties.

3. Elongated object according to claim 1, wherein the components includes polypropylene.

4. Elongated object according to claim 1, wherein the components are detachably fixed to the elongated object.

5. Elongated object according to claim 1, wherein the components are fixed to the elongated object by locking means at the longitudinal edges of the components.

6. Elongated object according to claim 1, wherein the electrical cable provided with the protective sleeving is fixed to the pipe with tapes, which are wrapped around the pipe as well as the protective sleeving in even or uneven spaces.

7. Elongated object according to claim 1, wherein the tapes includes a stainless metal such as stainless steel or a sea-water resistant copper alloy.

8. Elongated object according to claim 1, wherein a surface of the protective sleeving is shaped complementary to the surface of the pipe.

* * * * *